United States Patent [19]

Pfost

[11] Patent Number: 4,523,319

[45] Date of Patent: Jun. 11, 1985

[54] LASER TAPE SYSTEMS

[75] Inventor: Dale R. Pfost, Los Altos, Calif.

[73] Assignee: Brown University, Providence, R.I.

[21] Appl. No.: 493,149

[22] Filed: May 10, 1983

[51] Int. Cl.³ .................................................. H01S 3/06
[52] U.S. Cl. ....................................... 372/54; 372/66; 372/68
[58] Field of Search ........................ 372/54, 61, 66, 68

[56] References Cited

U.S. PATENT DOCUMENTS

| | | | |
|---|---|---|---|
| 3,675,157 | 7/1972 | Kaminow et al. | 372/53 |
| 3,747,021 | 7/1973 | Smiley | 372/7 |
| 4,002,998 | 1/1977 | Conwell et al. | 372/7 |
| 4,037,172 | 7/1977 | Filipescu et al. | 378/40 |
| 4,139,342 | 2/1979 | Sheldrake et al. | 378/53 |
| 4,270,095 | 5/1981 | Guch, Jr. et al. | 372/40 |

OTHER PUBLICATIONS

Johnson et al; "Plastic Q-Switch for Giant Pulse Lasers", *IBM Tech. Disc. Bull.*, vol. 15, No. 8, Jan. 73.

*Primary Examiner*—William L. Sikes
*Assistant Examiner*—Léon Scott, Jr.
*Attorney, Agent, or Firm*—Lahive & Cockfield

[57] ABSTRACT

A laser tape system for use in the resonant cavity of laser consisting of a flexible tape carrying at least one lasing dye and adapted for insertion into the resonant cavity, and a drive mechanism for moving the tape such that different portions of the tape may be focused within the cavity.

20 Claims, 12 Drawing Figures

LASER TAPE SYSTEMS

TECHNICAL FIELD

This invention relates to dye lasers and, in particular, to tunable dye lasers and to both continuous and pulsed laser systems employing flexible tape for dye transportation.

BACKGROUND OF THE INVENTION

Lasing dyes are generally defined as substances capable of emitting light when stimulated and typically have, as their lasing media, dye compounds composed of conjugated double bonds. A variety of such dyes are known and commerically available. See generally, Shafer, *Dye Lasers* (Springer-Verlag 1977) for a discussion of many such dyes. A spectrum of laser radiation, for example, can be achieved (from about 540 nm to about 740 nm) by employing the following dyes in sequence: Rhodamine 590 (6G), Rhodamine 610, Kiton Red, Thodamine 640, Sulforhodamine 640, DCM, Oxazine 720, and Carbazine. Many other lasing dyes are known including some which can extend the radiation spectrum into the infra-red and ultra-violet regions. Dyes are also used for selective absorption as opposed to gain, for example, for saturable absorption in the nonlinear optical systems.

Dye laser systems have become the workhouse for tunable laser applications, such as advanced spectroscopy, and may account for 70 percent of the laboratory laser market. In a typical system, a high intensity source of radiation, such as a nitrogen TEA laser or an argon-ion or krypton-ion laser, is used to optically "pump" the dye solution. The dye will fluoresce at a characteristic wavelength in response to the stimulation. Optical gain is achieved by locating the dye in a resonant cavity. In such systems, a tuning element is also included in the optical resonator to vary the wavelength by a limited amount.

A continuous spectrum is achieved by using a plurality of dyes and fine tuning the system by adjusting the tuning element. A number of commercially available dye laser systems employ a set of dyes encased in cuvettes or cells which are switched manually or under microprocessor control.

A problem common to laser systems employing dyes is that a large percentage of the input energy absorbed from the pump source appears as heat instead of luminescence. The heat leads to optical distortion and ultimately, when the pump focuses on a portion of the dye for too long, the dye compound itself decomposed requiring reactivation or replacement of the lasing medium.

Some commercial dye laser systems now employ free-flowing dye solutions (i.e., using ethylene glycol as a solvent) to transport the lasing dye into and out of the path of the pump beam and optical resonator. For examples of flowing systems and nozzle arrangements see U.S. Pat. No. 3,766,489 issued to Rosenberg in September, 1973; U.S. Pat. No. 3,805,187 issued to Lempicki on Apr. 16, 1974 and U.S. Pat. No 3,984,786 issued to Pike on Oct. 5, 1976. While flowing dye systems can prolong the useful lifetime of a medium, the liquid stream and pump apparatus make changing dyes slow, difficult and possibly dangerous since the dyes are reactive and potentially hazardous to a worker's health. The liquid streams are also limited in ultimate thinness and stability.

There exists a need for simpler, safer dye lasers capable of being tuned over a wide spectrum like the cuvette-switching systems described above but with more resistance to thermal degradation. Such dye lasers should be capable of prolonged use like flowing systems but without the handling and switching problems associated with liquid pumping.

SUMMARY OF THE INVENTION

It has been discovered that a simple laser system can be fashioned by employing a flexible tape as the carrier for a lasing medium. In one preferred embodiment, a lasing dye, such as Rhodamine-based dye, is imbedded in a polyurethane tape and excited by a pump source to lase in a direction perpendicular to, or at an angle (such as the Brewster angle) from the plane of tape. Movement of tape permits one to operate the laser at high power without damage or degradation of the medium. This movement is obtained from a novel dye transport system.

My laser tapes can employ a plurality of dyes at different locations, permitting an operator to obtain a wide spectrum of radiation without draining and replenishing any flowing liquids. Laser tapes also offer the advantages of simple manufacture, economy, and easy handling. Additionally laser tape can provided stable, non-turbulent dye transport with a uniform velocity and a thinner profile than possible with free-flowing systems.

My laser tapes can be fabricated in a variety of ways. The dyes may be dissolved in a solvent and mixed with polymeric precursors to form a dye-impregnated carrier by bulk polymerization. Polymers such as polyurethane, polyethylene, polystyrene, epoxies and polyesters may be used as the transparent carrier. Lasing dyes also can be incorporated into polymeric or glassy carriers by impregnation or diffusion. Alternatively, a backing such as a polyurethane or Mylar (TM) polyester tape may be coated with a dye solution which is then cured thereon and burnished for an optical finish. A dye solution can also be sandwiched between two or more tape layers. In some applications, it may be preferred to provide a highly reflective backing and employ the tape in a "fold-ray" configuration wherein the backing can form one wall of the resonant cavity. In another embodiment, liquid spheres or tubes of dye can be microencapsulated and then bound onto a backing or into a carrier to form the laser tape. Two tape layers can be joined at the edges to form a completely sealed thin stream of confined liquid dye for transport through the active region. Similarly tubes may be employed to envelop the liquid dye.

Laser tapes can fined use in many types of laser systems. For example, a pulsed laser can employ a laser tape in a passive, mode-locked, ring configuration. Continuous wave (CW) lasers also can use my laser tapes. Particular types of laser systems where laser tapes would be useful include spectrophotometry, range finding, and pure light sources. My laser tapes may also find application in automated processes, such as photochemical synthesis or deposition, where a programmed sequence of radiation at different wavelengths is needed to carry out a reaction.

In another aspect of my invention, a transport mechanism is disclosed which serves to house and circulate the laser tape. The transport mechanism includes a drive means and an orienting means. In a preferred embodiment, the transport mechanism also includes a means for varying the focus of the pump beam across the width of the tape to further reduce the possibility of dye degradation and decomposition.

While my invention will next be described in connection with certain preferred embodiments, it should be clear that various changes and modifications of the laser tapes, transport cassettes and systems, as they are described and illustrated, can be made without departing from the spirit and scope of the invention. For example, a wide variety of lasing dyes and carrier or backing materials may be employed; more than one layer of the same or different dyes may also be used. The transport system may be a reel-to-reel drive or a continuous loop arrangement and may include gear trains, capstans, rollers and idler wheels, all known in the tape transport art, to transport the laser tape into and out of the path of the pump and resonant cavity while orienting the tape at any preferred angle to the pump beam. Other lasing materials besides dyes, such as lasing solid or color-center materials, may also be incorporated into my tapes.

Laser tapes may also find application in communication and digital recording systems. The dyes incorporated onto the carrier or backing may be varied to encode a frequency modulated signal or may be selective bleached, ablated or enhanced to encode an amplitude modulated signal. These signals may then be read by pumping the regions of the tape sequentially and measuring the output of the system (i.e., with a frequency or amplitude-selective photo multiplier tube or diode).

DESCRIPTION OF THE PREFERRED EMBODIMENT

Figure 1:
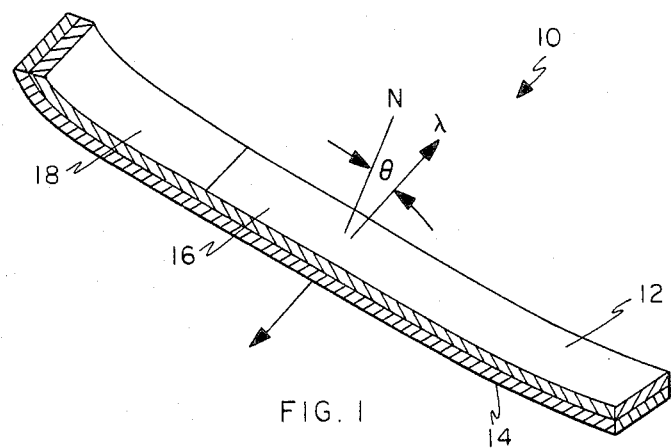
FIG. 1 is a schematic cross-sectional view of a laser tape according to the invention.

In FIG. 1 one embodiment of my laser tape 10 is shown comprising a dye-impregnated host 12 and a backing 14. The host 12 may be prepared by dissolving a dye compound, for example, Rhodamine 6G, in an organic solvent such as ethanol and mixing this solution with the precursors to a polymer; for example, the isocyanate and diol or carboxyl precursors of polyurethane, before polymerization. The polymer and dye mixture can be deposited upon a Mylar (TM) or similar backing 14 in liquid or semi-liquid form and cured in situ. The comcentration of the dye in the polymeric host may range from about $10^{-4}$ to $10^{-1}$ moles per liter and preferably from about $10^{-3}$ to $10^{-2}$ moles per liter. Host thickness may vary from 0.2 microns to 50 microns, preferably from about 1 micron to 25 microns, on a backing of about 25 microns.

My laser tapes can be fabricated by a continuous process wherein a wide sheet of backing material is coated with the dye host as it passes. The host is then smoothed by a knife edge as the backing sheet passes over a roller. The tape may be then cured by a heater and additional rollers can be employed to burnish the host to an optically transmissive surface and to maintain a uniform thickness in the sheet. The finished sheet can then be cut into strips and fed onto individual spools.

In another fabrication technique, a sheet of backing material can be coated with a binding agent (i.e., polyurethane again) and then passed slowly through an impregnation vat containing a high concentration dye solution. When the binding agent has been absorbed sufficiently, the tape sheet can then be dried, polished, cut and spooled, as described above. Other application techniques such as those used in the magnetic tape industry (i.e., off-set Gravure printing) may be used. By the Gravure method, the dye can be transferred from a porous and pitted surface to the uncut backing. This again can be followed by burnishing and other polishing techniques, and the tape is then cut and spooled.

Figure 2:
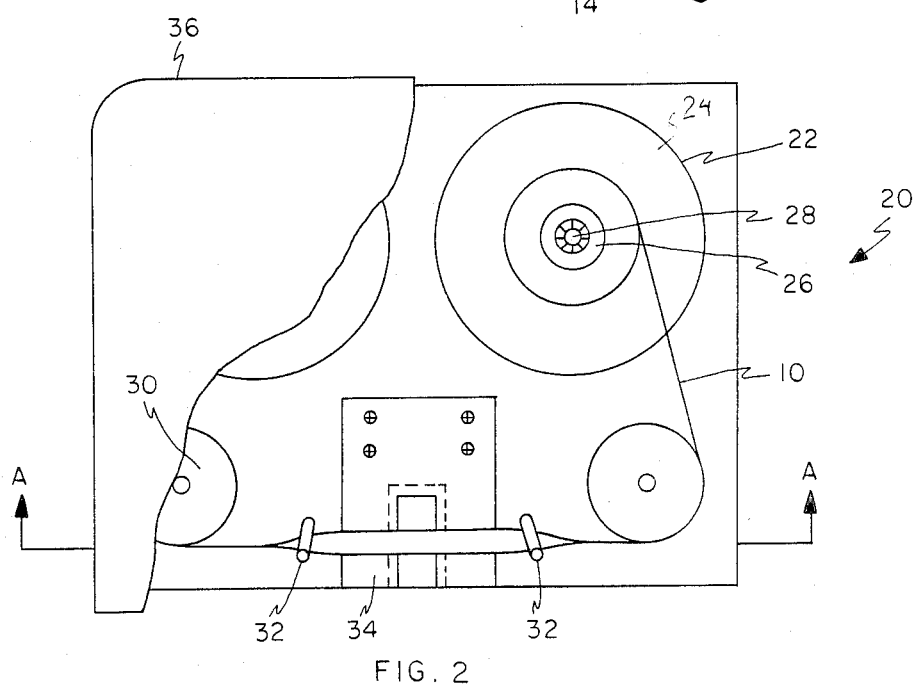
FIG. 2 is a partial cut-away top view of a cassette transport device for the laser tape.
Figure 2A:
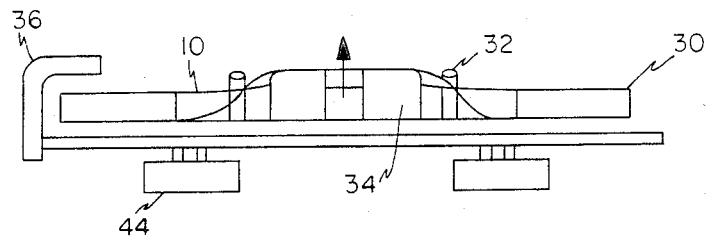
FIG. 2A is an end view of the same cassette device.

In FIGS. 2 and 2A, a reel-to-reel transport cassette 20 is shown comprising the tape 10 wound about two reels, 22. The reels 22 each can include a flange 24 and hub 26, into which hub drive posts 28 can be inserted. The tape 10 is also wound about idlers 30 and oriented by posts 32 to the appropriate angle as it passes through the tape-guide asembly 34 where it is pumped by the pump beam (not shown) to stimulate emissions. The tapeguide assembly 34 may include a cooling means. A drive means (not shown) is employed to rotate one or the other drive post 28 in order to transport segments of the tape sequentially into and out of the path of the pump beam. A capstan (not shown) may also be employed to pull the tape through the lasing zone. In operation, speeds froom about 1 to 1000 cm per second can be realized with a speed of about 1 meter per second a nominal useful speed. Housing 36 surrounds the transport assembly and permits an operator to easily insert and remove the cassette 20 from the laser system.

Figure 3:
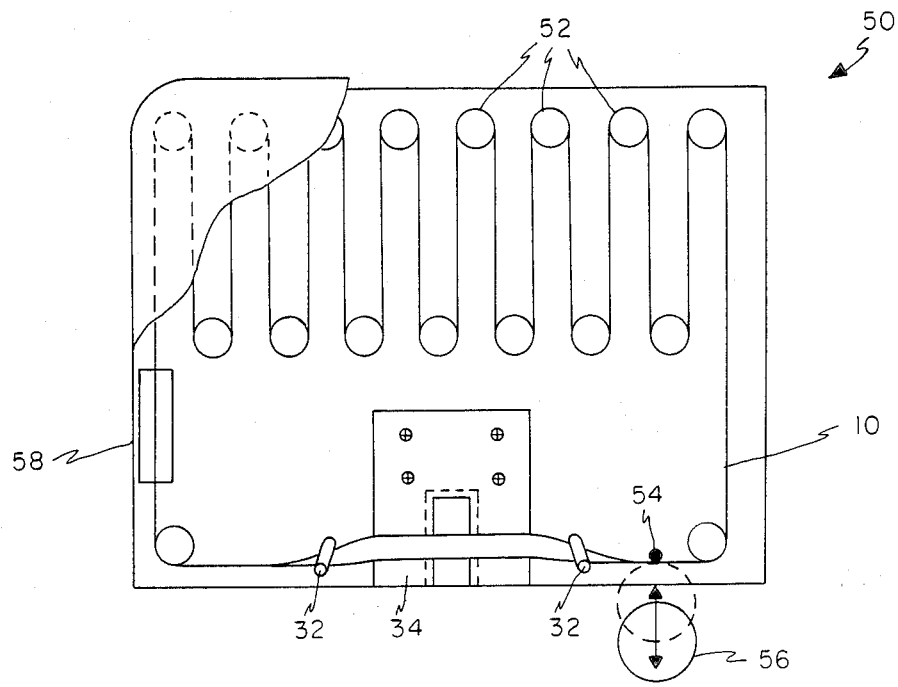
FIG. 3 is a partial cut-away top view of another cassette transport device for the laser tape.

In FIG. 3, a continuous loop transport cassette 50 is shown comprising tape 10 wound about a plurality of rollers 52 in a serpentine fashion. A capstan drive means 56 is shown cooperating with post 54 to pull the tape 10 through the lasing zone. In operation one or more of the rollers 52 may also be driven to take up the tape as it leaves the capstan 56. Orienting posts 32 and tapeguide assembly 34 operate as described above in connection with FIG. 2. Also shown in FIG. 3 is a reservoir 58 which may be incorporated into the cassette 20 or 50 as an additional feature. In operation, the reservoir may contain additional dye or a liquid coating which rejuvenates the tape each time before it passes through the lasing region. While a multiple roller continuous loop cassette 50 is shown in FIG. 3, it should be clear that other continuous loop arrangements, such as loose or free packed cassettes or concentric slip spool cartridges can also be fashioned to produce a continuous loop transport system.

Figure 4:
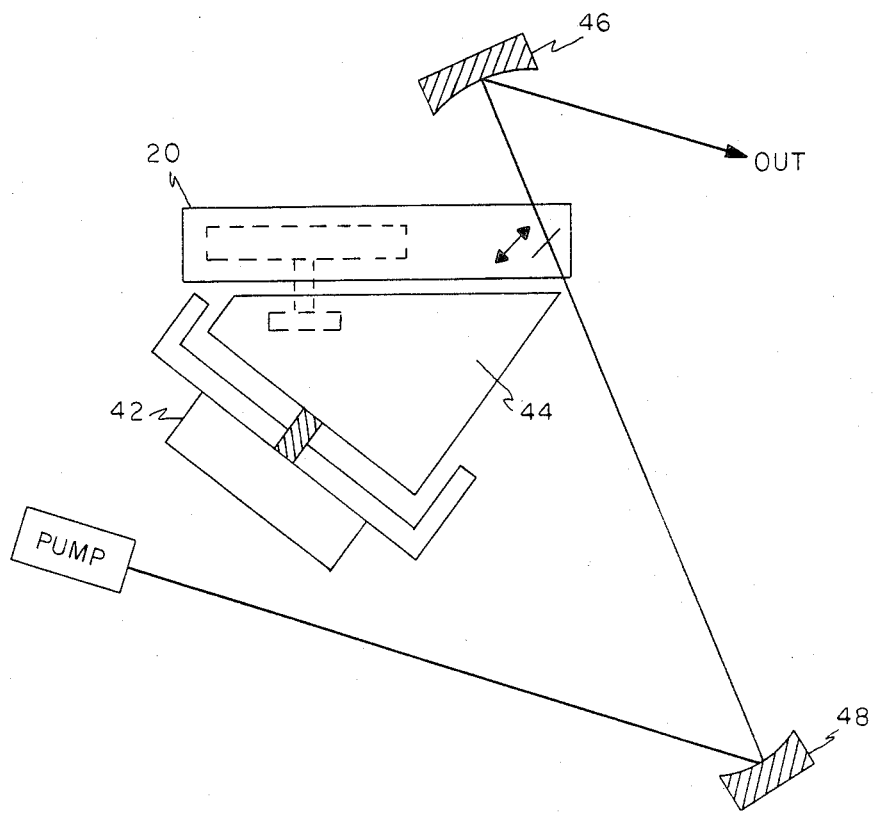
FIG. 4 is a schematic view of an apparatus for varying the focus of excitation energy upon a laser tape in a cassette device.

In FIG. 4, an apparatus 40 for transversely scanning the width of a laser tape 10 in a cassette 20 is shown comprising a linear translation stage 42 connected to the cassette 20 and drive means 44. The angle of translation is chosen to match the angle of the tape 10 so that transverse scanning of tape can be accomplished while maintaining the focus in the resonant cavity formed by mirrors 46 and 48. In operation, transverse scanning allowing the system to pump the tape at various locations and thus further minimize the risk of degrading the dyes. Scanning can also permit the system to operate with different dyes laid down on parallel tracks and wavelength tuning is accomplished by simple mechanical translation in a direction perpendicular to both the tape motion and normally to the tape surface.

Figure 5:
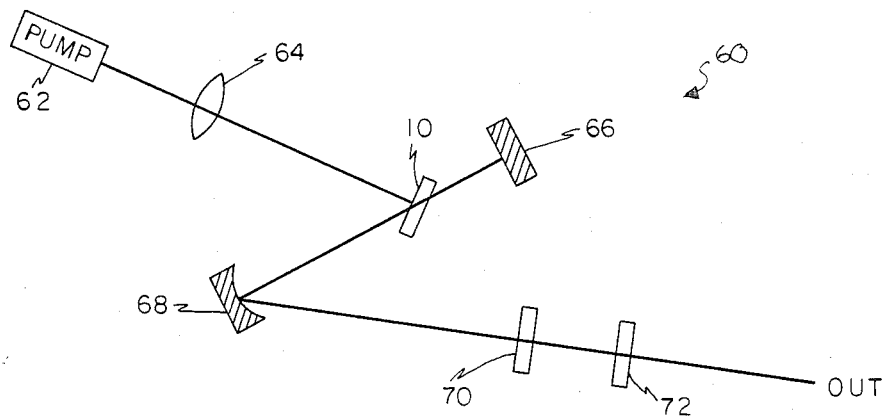
FIG. 5 is a schematic diagram of a laser system employing a laser tape.

In FIG. 5, a laser system 60 is shown comprising a pump source 62, a focusing lens 64, the tape 10, totally reflective mirrors 66 and 68, tuning element 70 and partially reflective mirror 72. The system 60 is useful for continuous wave (CW) operations in spectroscopy and the like. The tuning element 10 may be a birefringent filter or a etalon, both known in the art. See U.S. Pat. No. 3,868,592 issued to Yarborough on Feb. 25, 1975 and U.S. Pat. No. 3,707,687 for descriptions of a variety of tuning elements; the teachings of these patents are incorporated herein by reference.

Figure 6:
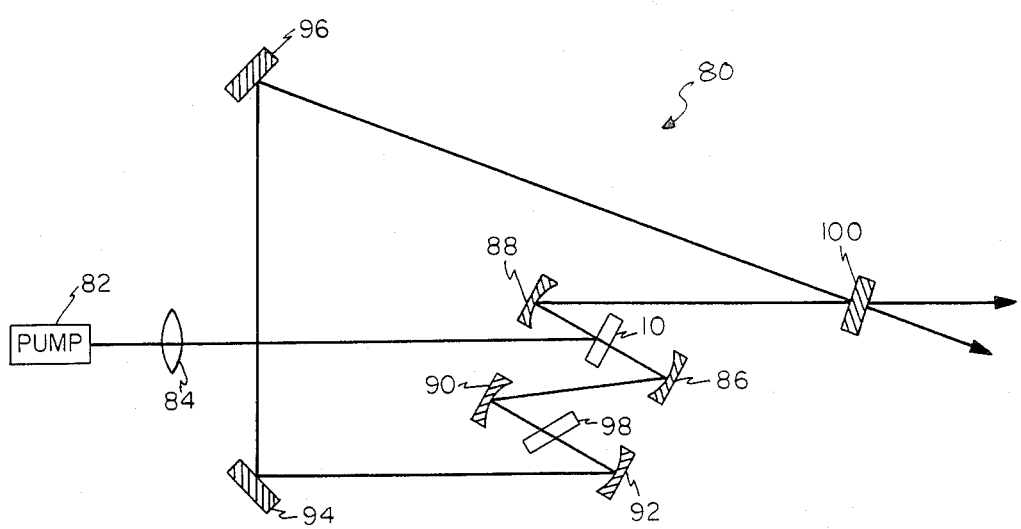
FIG. 6 is a schematic diagram of a ring laser system employing a laser tape.

In FIG. 6, a pulsed ring laser system 80 is shown comprising a pump source 82 focusing lens 84, tape 10, totally reflective mirrors 86, 88, 90, 92, 94 and 96, absorber 98 and partially reflective mirror 100. In operation, this system can generate extremely short pulses by the phenomenum of "colliding pulse modelocking". See Shapiro, *Ultrashort Light Pulses (Springer Verlag* 1977) for further details on modelocking. In operation, the system 80 employs the mirrors to produce a ring path for the laser radiation emitted by tape 10. The interaction of oppositely directed pulse in absorber 98 synchronizes, stabilizes and shortens the pulses. Picosecond or shorter pulses are possible with this technique. In this system, tapes serve as both gain medium and saturable absorber in two separate sub-cavities.

Figure 7A:
FIGS. 7A-7E are schematic views of alternative embodiments of a laser tape.
Figure 7B:
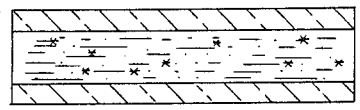
Figure 7C:
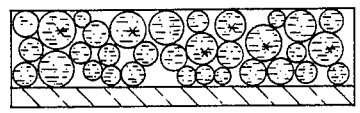
Figure 7D:
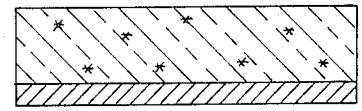
Figure 7E:

In FIGS. 7A–7E, a number of alternative embodiments of my laser tape are shown. In FIG. 7A, a tape without a backing is shown comprising a flexible but strong carrier impregnated with dye. Polyesters and similar materials can be used to produce the embodiment of FIG. 7A. In FIG. 7B, a tape comprising a dye "sandwiched" between two durable layers is shown. The dye may be carried in a polyurethane host and the protective layers may be mylar, for example. The protective layers can also be joined at the edges to form a completely sealed dye cavity inside the tape. In FIG. 7C, dye which has been microencapsulated is shaped into the form of a tape. The microcapsules may range from 1 to 25 microns and may be formed of a urea-formaldehyde resin, for example. Care should be taken to match the reflective indices of the capsulating material and the dye solution to maintain high transparency. These microcapsules maintain the liquid environment of the dye while supplying a dye host material which is easily transported. These microcapsules are then deposited on a backing. In FIG. 7D, a laser tape with a reflective backing is shown. The backing may be formed by vapor deposition of aluminum, for example. Additionally two backings, one totally reflective and one partially reflective may be used to sandwich the dye. In FIG. 7E, a tape with a plurality of parallel dye tracks is shown. Anti-reflection coating can also be incorporated onto the surfaces of my tapes.

What is claimed is:

1. A laser tape system for use in a resonant cavity of a laser having a source of excitation energy, the tape system comprising:
    A. a flexible tape carrying at least one lasing dye and located within the resonant cavity;
    B. a drive means for moving the tape such that the excitation energy can be focused on different portions of the tape within the cavity and
    an energy extraction means for extracting the energy from the resonant cavity.

2. The tape system of claim 1 wherein the tape is arranged about two reels.

3. The tape system of claim 2 wherein the system further comprises a cassette housing surrounding the tape and drive means.

4. The tape system of claim 1 wherein the tape is a continuous loop tape.

5. The tape system of claim 4 wherein the system further comprises a cassette housing surrounding the tape and driving means.

6. The tape system of claim 1 wherein the drive means is a means for moving the tape longitudinally and wherein the system further comprises a translating means for moving the tape transversely within the cavity.

7. The tape system of claim 1 wherein the tape carries a plurality of dyes having different lasing frequecies.

8. The tape system of claim 1 wherein the tape is encoded with information by varying the dye composition.

9. The tape system of claim 1 wherein the tape is encoded with information by varying the intensity distribution of the dye.

10. The tape system of claim 1 wherein the tape further comprises a dye-impregnated host material coated upon a backing material.

11. The tape system of claim 1 wherein the tape further comprises a flexible film material impregnated with dye.

12. The tape system of claim 1 wherein the tape further comprises a dye material enveloped by a plastic material.

13. The tape system of claim 1 wherein the tape further comprises encapsulated spheroids of dye bound to a plastic carrier.

14. The tape system of claim 1 wherein one wall of the resonant cavity is formed by a reflective backing on the tape.

15. A tunable laser comprising:
    A. a source of excitation energy;
    B. a resonant cavity;
    C. a flexible tape carrying a plurality of dyes having different lasing frequencies at discrete locations on the tape and located within the cavity;
    D. a drive means for moving the tape relative to the excitation source, whereby a tunable laser is achieved by moving the tape relative to the excitation source to cause different dyes to lase within the cavity and
    E. an energy extraction means for extracting the energy from the resonant cavity.

16. The laser of claim 15 wherein the drive means is a means for moving the tape longitudinally and wherein the laser further comprises a translating means for moving the tape transversely within the cavity.

17. The laser of claim 15 wherein the tape further comprises a flexible film material impregnated with dye.

18. The laser of claim 15 wherein the tape is a dye-impregnated host material coated onto a plastic backing.

19. A pulsed laser comprising:
    A. a source of excitation energy;

B. a resonant cavity formed by a plurality of reflective surfaces formed in a ring configuration;

C. a flexible tape carrying a lasing dye and adapted for insertion in the cavity;

D. a drive means for moving the tape such that different portions of the tape may be focused within the cavity; and E. an optical absorber, whereby light emitted from the tape as the lasing dye is excited within the cavity will travel in opposite directions about the ring configured cavity and interact within the absorber to yield mode-locked pulses and F. an energy extraction means for extracting the energy from the resonant cavity.

20. The pulsed laser of claim 19 wherein the optical absorber is also carried on a flexible tape located within the cavity.

* * * * *